United States Patent
van de Waerdt

(10) Patent No.: US 7,162,588 B2
(45) Date of Patent: Jan. 9, 2007

(54) PROCESSOR PREFETCH TO MATCH MEMORY BUS PROTOCOL CHARACTERISTICS

(75) Inventor: Jan-Willem van de Waerdt, Sunnyvale, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 412 days.

(21) Appl. No.: 10/226,158

(22) Filed: Aug. 23, 2002

(65) Prior Publication Data

US 2004/0039878 A1  Feb. 26, 2004

(51) Int. Cl.
G06F 12/00 (2006.01)

(52) U.S. Cl. .................. 711/137; 711/118; 711/213; 712/207

(58) Field of Classification Search ............... 711/118, 711/172, 137
See application file for complete search history.

(56) References Cited

U.S. PATENT DOCUMENTS

| | | | |
|---|---|---|---|
| 5,835,929 A | 11/1998 | Gaskins et al. | |
| 5,854,934 A * | 12/1998 | Hsu et al. | 717/161 |
| 6,279,081 B1 * | 8/2001 | Spencer et al. | 711/137 |
| 6,499,085 B1 * | 12/2002 | Bogin et al. | 711/118 |
| 6,622,213 B1 * | 9/2003 | Tsai et al. | 711/137 |
| 6,662,277 B1 * | 12/2003 | Gaither | 711/145 |
| 6,754,780 B1 * | 6/2004 | Carlson et al. | 711/137 |
| 2002/0087802 A1 * | 7/2002 | Al-Dajani et al. | 711/137 |

* cited by examiner

*Primary Examiner*—Mano Padmanabhan
*Assistant Examiner*—Jasmine Song

(57) ABSTRACT

Memory pages within a memory subsystem are typically accessed using an off chip memory controller coupled to an external bus. Data elements, in the form of a cache line, propagate along the external bus to the processor. Cache line pre-fetching provides a cache line from the memory subsystem to fulfill the processor request. Unfortunately, when the memory subsystem is being accessed by a fetch operation, a subsequent fetch request cannot access the memory subsystem until the previous transaction has completed. Thus subsequent transactions must wait until the previous transaction is completed. This waiting typically results in processor stall cycles, where the processor is stalled in waiting for the memory subsystem to become available. This is especially evident in multi-processor systems, where the addition of another processor does not cause the processing bandwidth to increase substantially. Especially when the processors are waiting for each other's memory subsystem transactions to complete. It would be more advantageous to provide a fetch operation that has a variable fetch size that would allow each of the processor to incur less stall cycles, thus increasing processing bandwidth.

26 Claims, 6 Drawing Sheets

PROCESSOR PREFETCH TO MATCH MEMORY BUS PROTOCOL CHARACTERISTICS

FIELD OF THE INVENTION

This invention relates to the area of data pre-fetching and more specifically to the area of pre-fetching data from memory in a manner that facilitates a decrease in processor stall cycles.

BACKGROUND OF THE INVENTION

As integrated circuit technology progresses to smaller feature sizes, faster central processing units (CPU)s are being developed as a result. Unfortunately access times of memory subsystems, such as main memory in the form of random access memory (RAM), where instruction and data are typically stored, have not yet matched those of the CPU. The CPU must access these slower devices in order to retrieve instructions and data therefrom for processing thereof. In retrieving these instructions and data a bottleneck is realized between the CPU and the slower memory subsystem. Typically, in order to reduce the effect of this bottleneck a cache memory is implemented between the memory subsystems and the CPU to provide most recently used (MRU) instructions and data to the processor with lower latency. The purpose of the cache memory is to increase instruction and data latency of information flowing from the memory subsystem to the CPU. The latency is measured by an amount of clock cycles required in order to transfer a predetermined amount of information from main memory to the CPU. The fewer the number of clock cycles required the better the latency.

During CPU execution of instructions both the memory subsystem and cache memory are accessed. Cache memory is accessed first to see if corresponding data bytes fulfill the memory access request. If the memory access request is fulfilled then the a cache "hit" results, otherwise if the memory access request is unfulfilled then memory subsystem is accessed to retrieve the data bytes. Having to access the memory subsystem to retrieve the required data bytes is termed a cache "miss." When a cache miss occurs the processor incurs stall cycles while the required data bytes are transferred from the memory subsystem to the processor and cache memory.

A process of pre-fetching data bytes from the memory subsystem is performed to reduce processor stall cycles. By anticipating future use of instruction and data, prefetching of this anticipated information from the memory subsystem is performed such that the cache memory can be provided with this information faster when the use actually takes place. As a result, the amount of processor stall cycles can be reduced since the data was prefetched and does not need to be fetched from the memory subsystem.

The process of pre-fetching data blocks uses a data bus, which provides for communication between the memory subsystem and cache memory. As a result of the pre-fetching operation the data bus bandwidth is decreased. In some cases the process of pre-fetching retrieves data blocks from the memory subsystem that will not be used by the processor. This adds an unnecessary load to the bus utilization. Fetching a data block into a certain level of the cache memory hierarchy requires replacing of an existing cache data block, where the replacing of such a data block may result in extra bus utilization since another fetch operation is generated to provide the correct data from the memory subsystem. Often, the cache data blocks are re-organized such that the block being replaced is moved to a lower level of the cache memory hierarchy. Furthermore, if the moved data block is no longer available at the highest level of cache memory hierarchy for future reference then a cache miss may result.

Furthermore, pre-fetching of extra data blocks in anticipation of their future use by the processor may also be inefficient because of the following reason. Having a number of pre-fetches occurring one after another may cause bursty bus utilization, which ends up decreasing the data bus bandwidth. Bursty bus utilization may cause temporary starvation of other components using the shared data bus resource, which may result in other types of processor stall cycles, thus having a degrading effect on processor and system performance.

When transferring data bytes from the memory subsystem to the cache memory, a unit of transfer is known as a cache line. Once a cache line has been transferred from the memory subsystem a subsequent cache line is pre-fetched from memory. The pre-fetching process is based on the assumption that pre-fetching the next sequential line from the memory subsystem will improve processor performance. When a cache miss on a current cache line occurs, the respective cache line is already fetched from the memory subsystem effectively reducing cache line fetch latency. In this case, a pre-fetched cache line is put into the cache memory only when a cache miss on this line occurs, before the cache miss occurs the pre-fetched cache line resides in a pre-fetch cache line buffer. This prevents victimizing useful cache lines by not used pre-fetched cache lines.

This process of performing next sequential cache line pre-fetching is a well-known technique that is used to reduce the effects of the slow memory subsystem access times, i.e. memory latency, visible to the processor. By hiding this latency using pre-fetching the processor incurs fewer stall cycles because a potentially anticipated cache line is already present in the pre-fetch buffer close cache memory. Such that the processor can access this pre-fetched cache line from cache memory more efficiently, thus potentially improving the processor performance.

Cache line pre-fetching may degrade system performance. Pre-fetched cache lines that are not subsequently required by the processor are then transferred from the memory subsystem to the processor, thereby consuming memory bandwidth, preventing other memory transactions to take place. This negative side effect becomes more apparent in a Unified Memory system on chip architecture in which multiple processing elements have to share the critical memory bandwidth resource. Therefore, pre-fetching is a process which needs to be addressed from a system architecture perspective as well as processor point of view.

Typically, a size of the cache lines used in cache memories is determined to allow optimal performance of the processor; typically, this requires cache line size to be optimized for the most common situation, a cache hit. Also, the size of a cache line relates to whether an increase or decrease in cache misses. If a cache line is too large then cache pollution results since the cache memory contains too much data and a majority of this data is unusable by the processor because it is incorrect. If the cache line is too small then the cache does not contain sufficient amounts of data to prevent most cache misses and the processor needs to pre-fetch data from the memory subsystem to facilitate processing operation.

The above problems become even more significant in multi processor systems where a plurality of processors share a same memory and bus resource. In such a system, cache misses affect performance of all the processors and effective resolution of cache misses is required in a timely manner in order to maintain overall system performance. Efficient pre-fetching significantly improves processor performance.

SUMMARY OF THE INVENTION

In accordance with the invention there is provided a method of cache line fetching comprising the steps of: providing a first memory having a memory location therein for storing a first set of N data elements and a second adjacent set of N data elements, both sets of data elements line aligned within the first memory, wherein N data elements form an integral number of lines; providing a cache memory; providing a processor for accessing the cache memory and for operating in each of two modes, a first mode and a second mode; determining a mode of operation of the processor; when the processor is in the first mode of operation, transferring data from the first memory to the cache memory N data elements at a time; and, at least some times when the processor is in the second mode of operation, transferring data from the first memory to the cache memory M×N data elements at a time wherein M is an integer greater than 1.

In accordance with another aspect of the invention there is provided a memory having data stored therein, the data relating to instructions for performing the steps of: determining a mode of operation of the processor from a plurality of modes of operation including a first mode of operation and a second mode of operation; when the processor is in the first mode of operation, transferring data from the first memory to the cache memory N data elements at a time; and, at least some times when the processor is in the second mode of operation, transferring data from the first memory to the cache memory M×N data elements at a time wherein M is an integer greater than 1.

In accordance with yet another aspect of the invention there is provided a memory system circuit comprising: a cache memory; and, a cache line fetch circuit for in a first mode of operation fetching in a single operation N data elements forming one or more cache lines into the cache memory and in a second other mode of operation fetching in a single operation M data elements forming more than a cache line into the cache memory, wherein M>N and wherein each of M and N is an integral number of cache lines.

BRIEF DESCRIPTION OF THE DRAWING

The invention will now be described with reference to the drawings in which.

DETAILED DESCRIPTION OF THE INVENTION

Figure 1A:
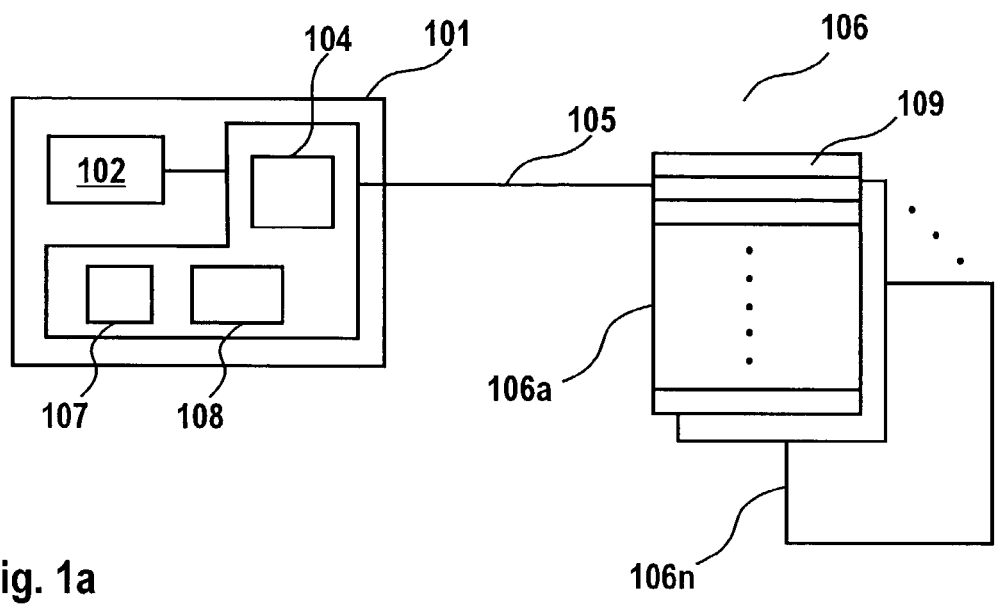
FIG. 1a illustrates a prior art system on chip architecture.

FIG. 1a illustrates a prior art system on chip (SoC) architecture 101. The SoC defines a processor 102 that is coupled to an off chip memory controller 104. The off chip memory controller is coupled via an external data bus 105 to a memory subsystem 106 in the form of a dynamic random access memory (DRAM). The memory subsystem 106 is comprised of 'n' memory pages 106a to 106n, where each of the n pages is individually addressable. A cache buffer 108 is also provided for storing cache lines transferred from the memory subsystem prior to having them stored within a cache memory 107 provided as part of the SoC 101.

The off chip memory controller 104 is used to access any of the memory pages 106a to 106n to provide data bytes from the memory subsystem using the external data bus 105 to the cache memory 107 and cache buffer 108. Typically, an amount of data bytes transferred between the memory subsystem 106 and the cache memory 107 or cache buffer 108 is an amount of data bytes forming a cache line 109. The off chip memory controller 104 is controlled by the processor 102 and is responsible for executing pre-fetch transactions from the memory subsystem 106 to cache memory 107 and cache buffer 108 in order to reduce processor stall cycles.

When the processor 102 generates a pre-fetch transaction, a constant latency and a variable latency may result. The constant latency has is a constant amount of time, in that a same amount of time is required to set up every pre-fetch transaction. The variable latency scales in time in dependence upon an amount of data elements that are to be pre-fetched during the transaction. Therefore the variable latency time is multiplied by a number of data elements transferred in the pre-fetch operation and added to the constant latency to result in a total pre-fetch latency.

When a pre-fetch transaction takes place the external data bus 105 is dedicated to the current pre-fetch transaction and as a result other transactions cannot share the same external bus 105 resource at the same time until the pre-fetch is completed. The time taken for completion of a pre-fetch transaction is dependent upon a number of data bytes transferred in the transaction. Thus, in some cases it is more advantageous to perform pre-fetch transactions having smaller cache line size, such that the external bus resource is less utilized for each transaction. However, by generating a larger number of pre-fetch transactions more time is spent in setting up each transaction and hence an amount of time attributed to the constant latency increases. Therefore, there is a tradeoff between a number of pre-fetch transactions and an amount of data transferred in each pre-fetch transaction.

Additional difficulties arise when the memory subsystem is accessed, since there is an additional latency incurred by accessing of memory pages within the memory subsystem 106. When a memory page within the memory subsystem 106 is accessed, subsequent access to that same memory page is not possible because a memory circuitry used for storing that page is typically single ported and therefore does not support multiple reads at different addresses. If a pre-fetch transaction is already being performed for accessing a current memory page at a first address then execution of a subsequent transaction that accesses the same memory page at a second address is delayed until the prior transaction has been completed. This poses a problem for next sequential cache line pre-fetching since typically the next sequential cache line is located in the same memory page as the previously fetched cache line. However, the process of pre-fetching the next sequential cache line incurs a delay prior to commencement because the next sequential cache line pre-fetch transaction has to wait until the previous cache line fetch transaction has completed. Once the fetch operation has completed then the memory page is available for access and the next sequential cache line pre-fetch transaction commences. Typically, during the waiting time for the transaction to complete, the processor experiences stall cycles, thus resulting in less efficient instruction processing by the processor 102. Not to mention that while the external data bus resource is being utilized for pre-fetch operations interference may result from other memory subsystem transactions attempting to use the same bus resource. Of course, internal data busses coupling the processor, the cache memory, and the off chip memory controller are also utilized during pre-fetch operations and hence fetching of the next sequential cache line may result in interference from memory subsystem transaction originating from other SoC elements. Thus, a large transaction latency is typically observed because of closed off-chip memory pages within the memory subsystem 106. The above problems are compounded significantly in multi processor systems.

Figure 1B:
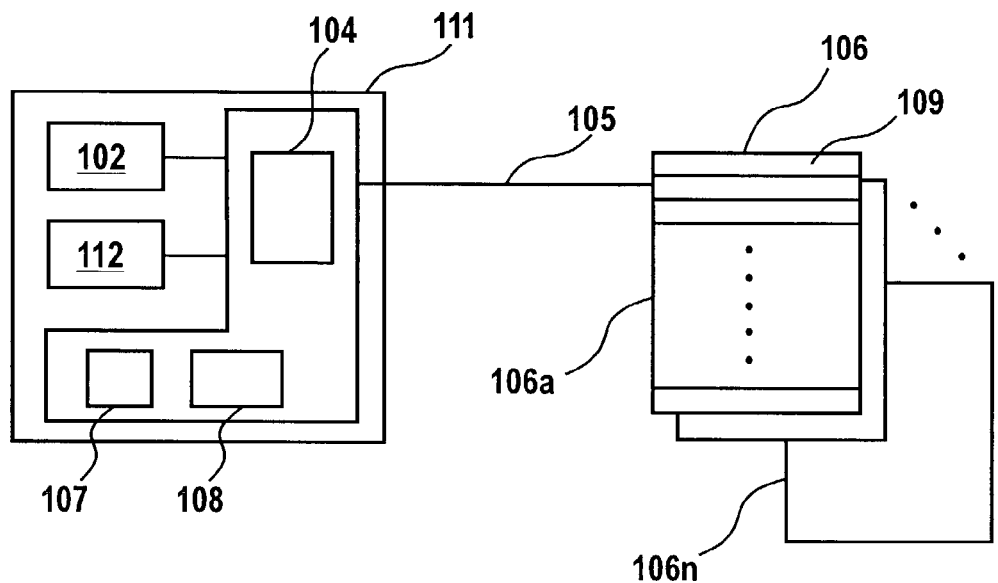
FIG. 1b illustrates a prior art multi-processor system on chip (SoC) architecture.

FIG. 1b illustrates a multi-processor system on chip (SoC) architecture 111. The architecture within the SoC is similar to that shown in FIG. 1a. However, in this case an additional processor 112 has been added. Both of the processors 102 and 112 are coupled to the off chip memory controller 104 and share the external data bus 105 when retrieving of data elements from the memory subsystem 106. Thus during some situations the off chip memory controller 104 is accessing the memory subsystem to fulfill a pre-fetch transaction for the processor 102. During these same situations the additional processor 112 has no immediate access to the memory subsystem because the external bus 105 is being utilized. If the additional processor 112 is waiting to initiate a pre-fetch operation the additional processor 112 incurs stall cycles during this time in order to wait for the pre-fetch operation for the processor 102 to complete. Therefore, adding the additional processor to the SoC does not necessarily increase the processing capacity of the system. Having each processor nearly constantly waiting for the other processor's pre-fetch operation to be completed reduces the performance of the dual processor system to that of a single processor system or even worse. Thus, unless benefits of adding the additional processor facilitate increased processing bandwidth, multiprocessor systems are non-advantageous. In fact performance decreases when the two processors are competing with one another for the same external bus 105 resource.

Figure 1C:
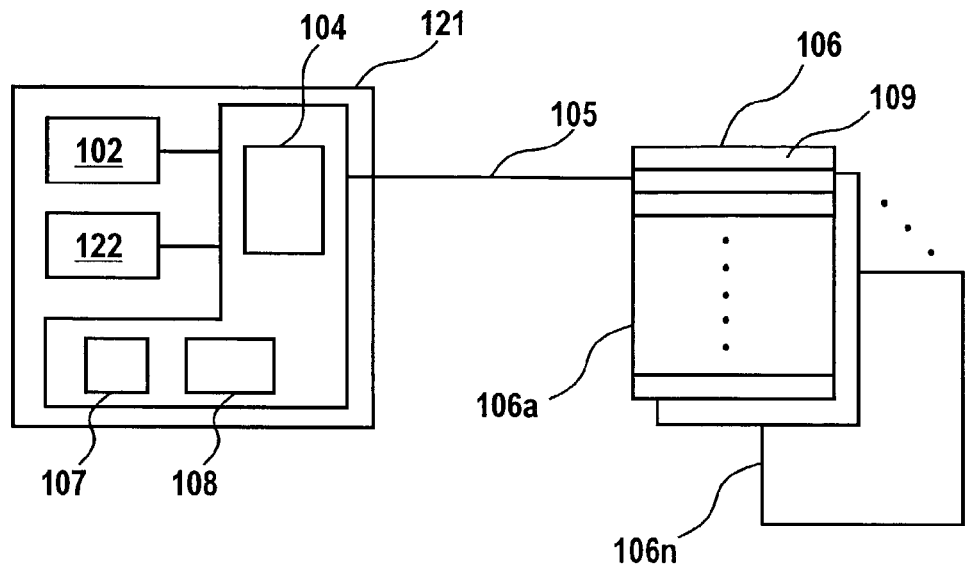
FIG. 1c illustrates another prior art multi-processor system on chip (SoC) architecture.

FIG. 1c illustrates another embodiment of a multi-processor system on chip (SoC) architecture 121. The architecture within the SoC is similar to that shown in FIG. 1b. However, in this case the additional processor 112 is replaced by a specialty processor 122. Operation of the SoC is nearly identical to that of FIG. 1b. That said, because each of the processors is different and is for providing performance for different applications, such a system will likely still experience a performance improvement even when stall cycles are abundant.

Of course, a reduction in stall cycles will result in an improvement in performance of any of the above described systems.

Herein, a next-sequential line pre-fetch technique is described that exploits characteristics of the SoC interface to the memory subsystem. Rather than generating a single cache line pre-fetch from the memory subsystem for each occurrence of a cache miss, a single transaction is generated that fetches both the cache line for which the miss occurred and the next sequential cache line. The result is a single memory subsystem pre-fetch transaction that has a double transaction size when compared to a transaction size when only a single cache line is pre-fetched from the memory subsystem; of course the constant latency remains the same. Therefore, a pre-fetch transaction of a single $2n$-element request is generated rather than an n-element request followed by a subsequent n-element request when the first n-elements fail to resolve the cache miss, with n being an amount of elements in a cache line. This type of pre-fetch operation thus reduces bursty bus utilization. The variable latency being the same in both cases when $2n$ elements are retrieved, since the same number of data bytes are transferred in the pre-fetch operation. Of course, $2n$, $3n$, $4n$, etc element request pre-fetch transactions are possible depending on which is most efficient in terms of decreasing stall cycles and bursty bus utilization.

Figure 2A:
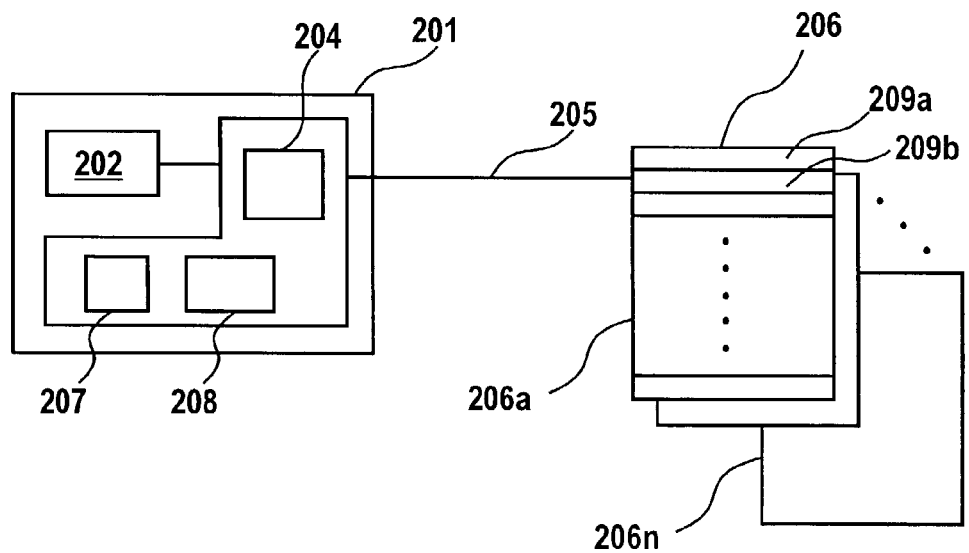
FIG. 2a illustrates a system on chip architecture for use with the present invention.

FIG. 2a illustrates a system on chip architecture (SoC) 201. The SoC defines a processor 202 that is coupled to an internal data bus and to an off chip memory controller 204. The off chip memory controller is coupled via an external data bus 205 to a memory subsystem 206 in the form of a dynamic random access memory (DRAM), or a first memory 206. The memory subsystem 206 is comprised of 'n' memory pages 206a to 206n, where each of the n pages is individually addressable. A cache buffer 208 is also provided for a single cache line transferred from the memory subsystem and for storing a multiple cache line transferred from the memory subsystem prior to having them stored within a cache memory 207 provided as part of the SoC 201.

The off chip memory controller 204 is used to access any of the memory pages 206a to 206n to provide data bytes from the memory subsystem using the external data bus 205 to the cache memory 207 and cache buffer 208. Typically, an amount of data bytes transferred between the memory subsystem and the cache memory 207 or cache buffer 208 is an amount of data bytes forming a cache line; however, during a cache miss situation, an amount of data bytes forming multiple cache lines are transferred. The off chip memory controller 204 is controlled by the processor 202 and is responsible for executing pre-fetch transactions from the memory subsystem 206 to cache memory 207 and cache buffer 208 in order to reduce processor stall cycles. The off chip memory controller 204 includes circuitry therein for performing a single cache line 209a transfer operations and for performing multiple cache line transfer operations. For example, the multiple cache line transfer operation transfers two sequential cache lines 209a and 209b during a cache miss situation.

Figure 2B:
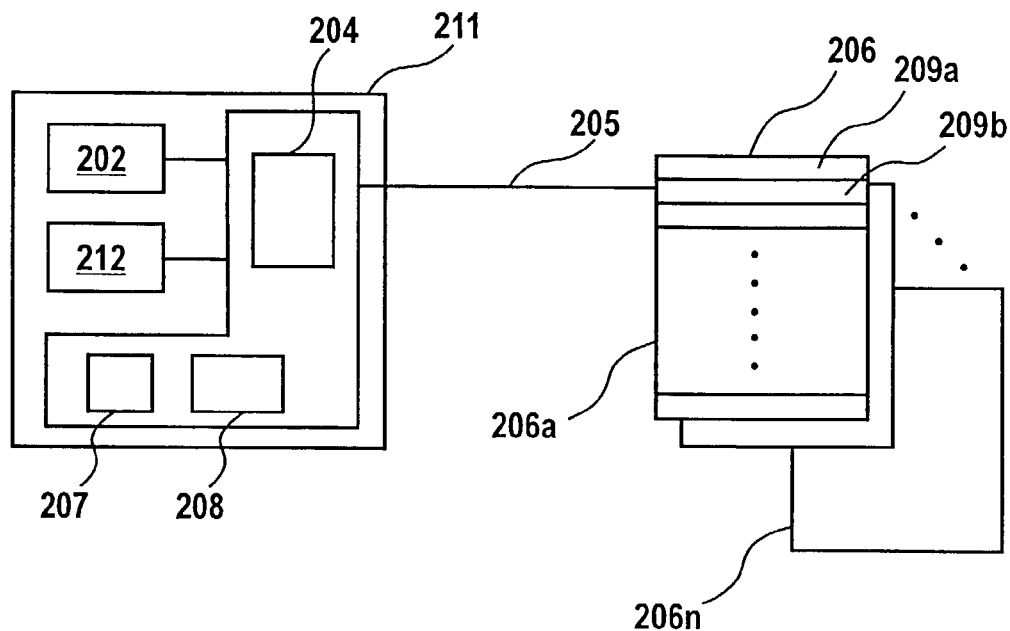
FIG. 2b illustrates a multi-processor system on chip (SoC) architecture.
Figure 2C:
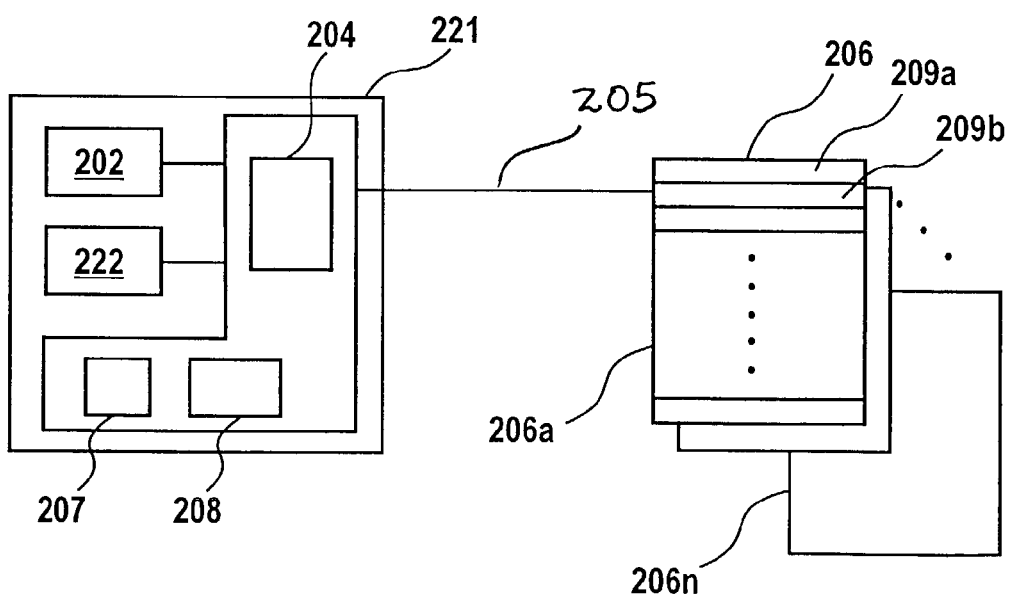
FIG. 2c illustrates another embodiment of a multi-processor system on chip (SoC) architecture.

FIG. 2b illustrates a multi-processor system on chip (SoC) architecture 211. The architecture within the SoC is similar to that shown in FIG. 2a. However, in this case an additional processor 212 has been added. Both of the processors 202 and 212 are coupled to the off chip memory controller 204 and share the external data bus 205 when retrieving of data elements from the memory subsystem 206. Thus during some situations the off chip memory controller 204 is accessing the memory subsystem to fulfill a pre-fetch transaction for the processor 202. During these same situations the additional processor 212 has no immediate access to the memory subsystem because the external bus 205 is being utilized FIG. 2c illustrates another embodiment of a multi-processor system on chip (SoC) architecture 221. The architecture within the SoC is similar to that shown in FIG. 2b. However, in this case a specialty processor 222 replaces the additional processor 212. Operation of the SoC is nearly identical to that of FIG. 2b.

Figure 2D:
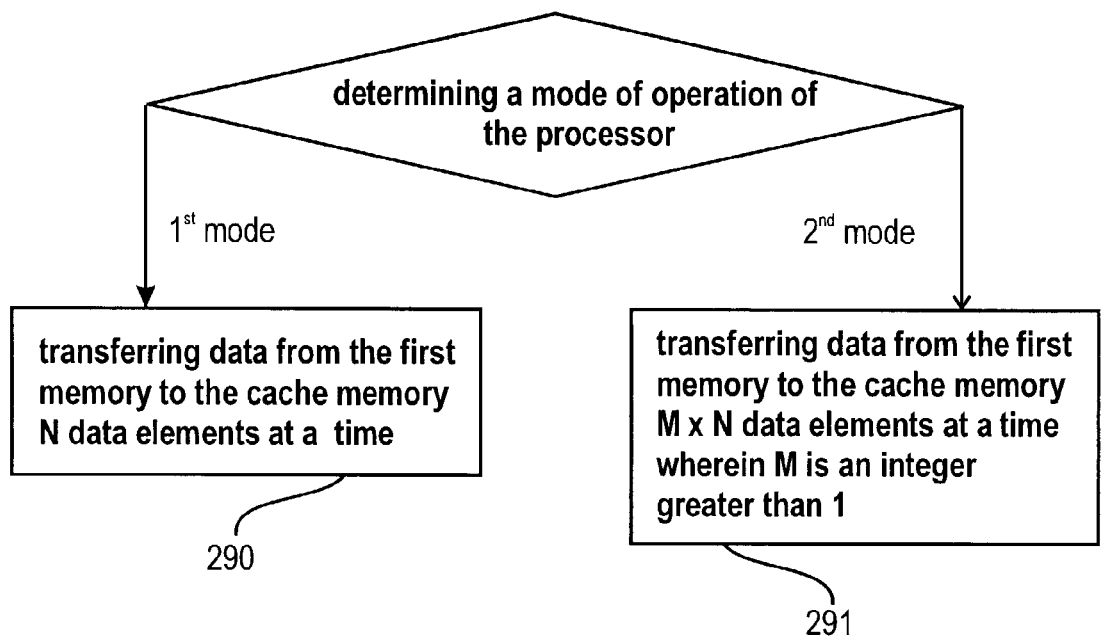
FIG. 2d illustrates first and second modes of operation for the processor.

In accordance with FIG. 2d, a flowchart is shown indicative of whether the processor operates in a first mode 290 of operation or a second mode 291 of operation for transferring of data in the pre-fetch transaction. In the first mode of operation 290 the processor transfers data from the first memory to the cache memory N data elements at a time, and in the second mode of operation 291 the processor transfers data from the first memory to the cache memory M×N data elements at a time wherein M is an integer greater than 1.

Figure 3A:
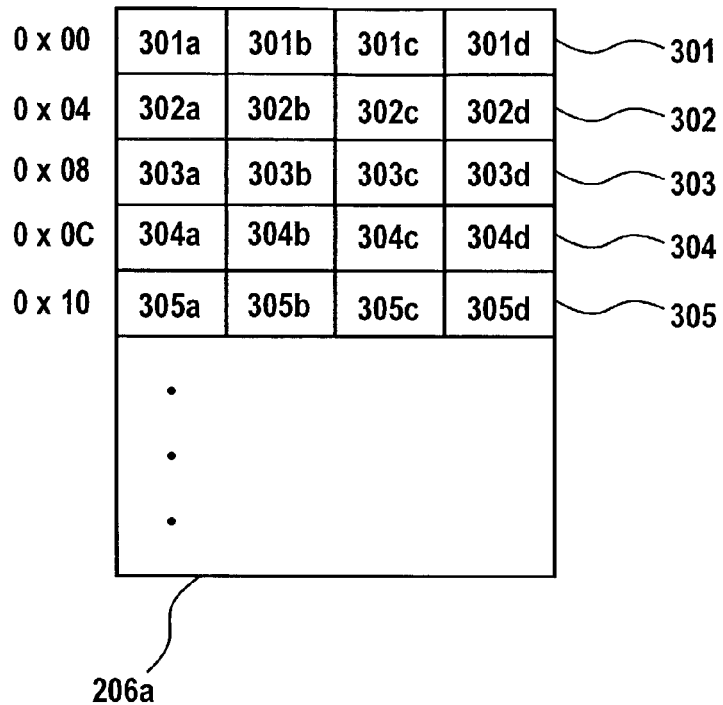
FIG. 3a is a simplified memory diagram of a memory subsystem memory page having five sequential cache lines of four data elements stored therein.

In accordance with FIG. 3a, a memory subsystem memory page 206a having five sequential cache lines 301 through 305 stored therein is shown. Each of these cache lines has 4 data elements, 301a to 301d through 305a to 305d, respectively. The 5*4 data elements are located at starting addresses 0x00, through 0x10. If the addresses of the data elements are represented generally by $A_n$ then a next sequential line to an nth element is found using $A_{n+1}=A_n+$ (4*element size).

When transferring of cache lines from the memory subsystem to circuit elements within the SoC, memory system, protocols are used. With respect to these protocols there are typically three aspects that are observed. Firstly, memory subsystem protocols typically support transaction sizes that are an integer power of 2 of the transaction element size. Namely they operate using transaction sizes that are powers of 2, i.e. $2^n$. As a result, two, four and eight element data transfers are common for memory subsystem transactions.

Secondly, the memory subsystem transaction memory region is usually a region that is aligned according to the transaction size. So a four element transaction refers to a region in which the first element is four element aligned, as shown in FIG. 3a where $A_n$ MOD (element size)=0. Having aligned cache lines in the memory subsystem facilitates reading of these cache lines from the memory subsystem. Though the cache lines of FIG. 3a each have 4 elements— thus $A_n$ mod 4=0—eight element cache lines are also easily supported. A memory having eight element cache lines is shown in FIG. 3b.

Figure 3B:
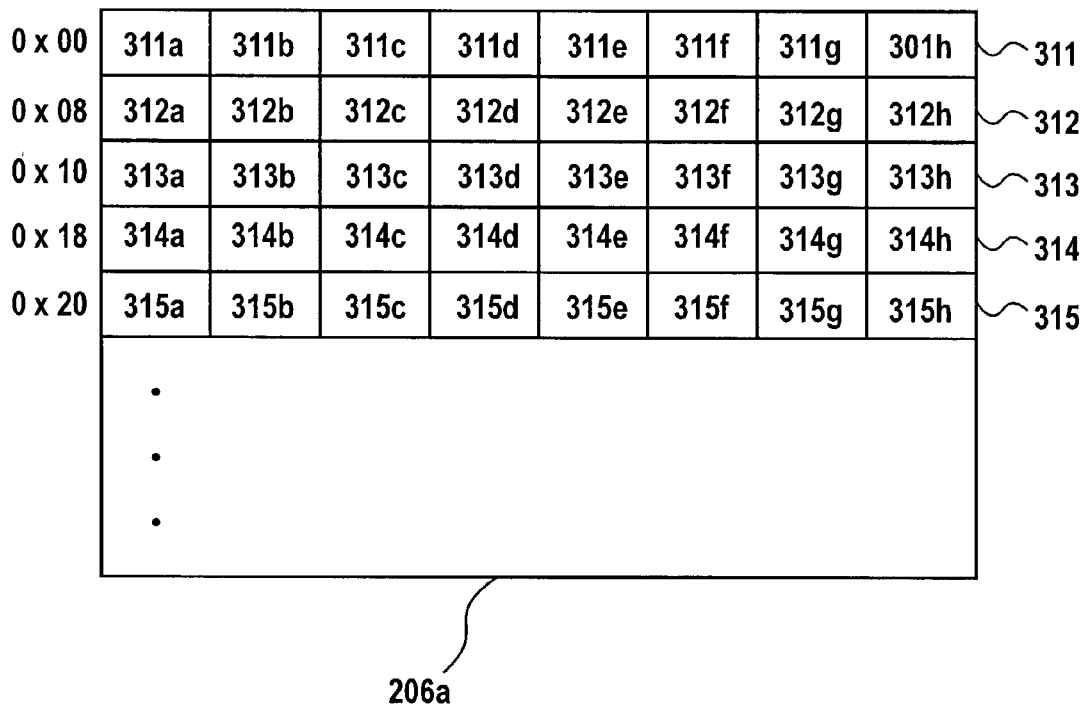
FIG. 3b is a simplified memory diagram of a memory subsystem memory page having five sequential cache lines of eight data elements stored therein; and, FIG. 4 illustrates a simplified memory diagram having four data element aligned memory architecture with heavier lines separating 8 data element.

In accordance with FIG. 3b, a memory subsystem memory page 106a having five sequential cache lines 311 through 315 stored therein is shown. Each of these cache lines has 8 data elements, 311a to 311h through 315a to 315h, respectively. The 5*8 data elements are located at starting addresses 0x00, through 0x20. If the addresses of the data elements are represented generally by $A_n$ then a next sequential line to an nth element is found using $A_{n+1}=A_n+$ (8*element size).

Furthermore, most memory subsystem protocols support linear address wrap around within a transaction. Therefore, if a cache line is accessed using other than a four element aligned boundary, the four data elements are still transferred, however not in sequential data element ascending address order. If for instance a cache miss occurs for element 301b, then the pre-fetch transaction begins with the address for element 301b thus transferring the data elements in the following order: 301b, 301c, 301d, 301a from the memory subsystem. Four elements are transferred since this is the cache line size used in this example and the memory subsystem is four element line aligned. As soon as the element that caused the cache miss and within the cache line at address 0x00, element 301b, is provided to the processor from the memory subsystem, the processor commences unstalled operation. Of course, to free up a refill unit of a processor for future use the entire four element cache line is transferred from the memory subsystem.

Though, it appears that a difference between a memory subsystem architecture of FIG. 3a and FIG. 3b is merely a design choice, it has now been found that supporting both architectures, each for a different operating mode of the processor, provides benefits to performance of the overall system. A explanation is provided below with reference to the memory diagram of FIG. 4.

Figure 4:
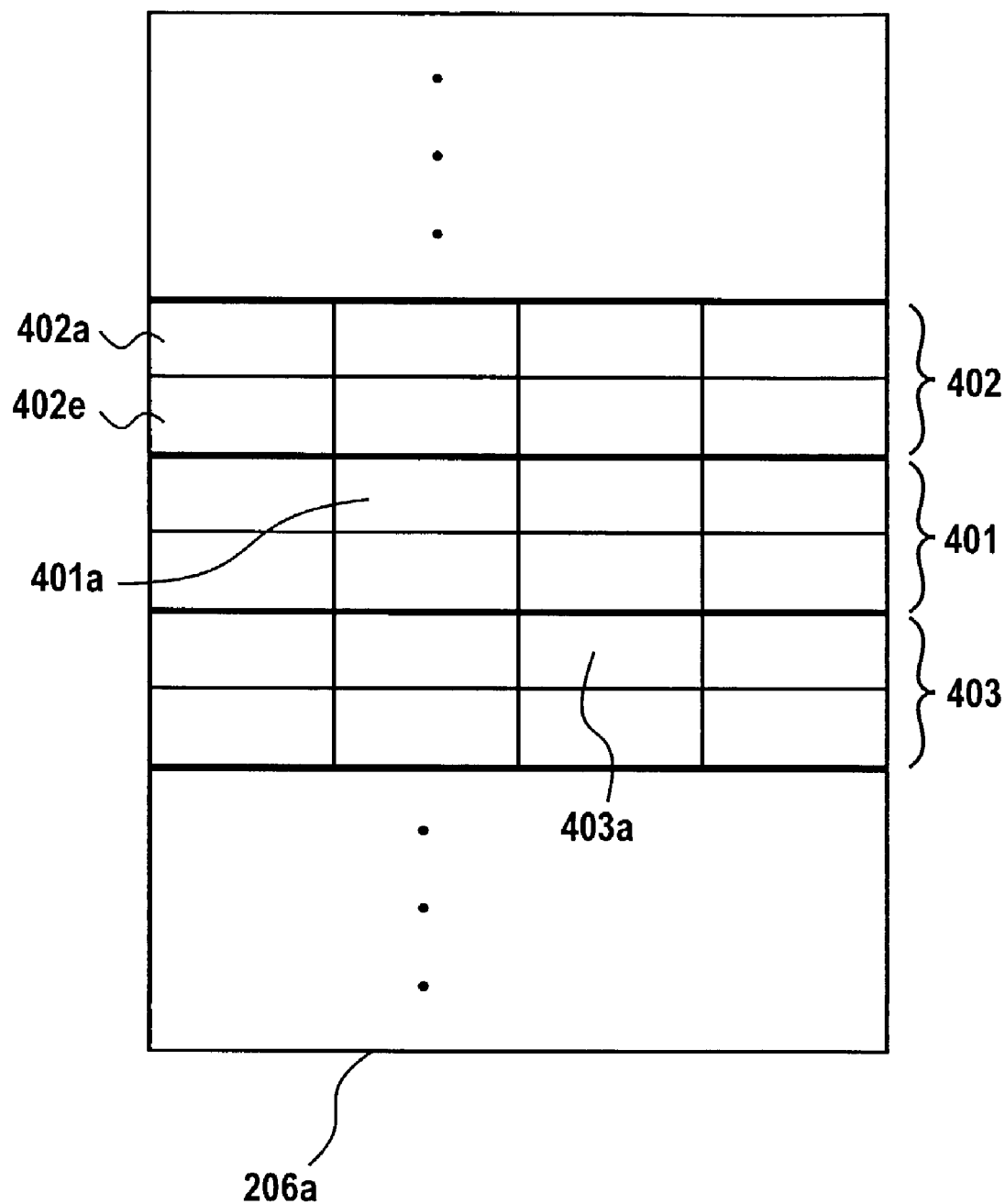

In FIG. 4, a four data element aligned memory architecture is shown with heavier lines separating 8 data element aligned data elements. When a cache hit situation occurs, the cache is operated in a similar fashion to prior art caches wherein a cache line is transferred within a single memory access operation as the processor operates in the first mode 290. When a cache miss occurs two cache lines are transferred within a single memory access operation as the processor operates in the second mode 291. Preferably, the two cache lines are 8 element aligned. Thus, when a cache miss occurs for data element 401a, cache lines 401 are retrieved. However, when a cache miss occurs for element 402e, a single cache line is transferred in a first cache miss data transfer operation; thereafter, two cache lines 401 are retrieved if the cache miss situation persists. Alternatively, two cache lines 402 are retrieved; this is less advantageous as it increases the bus utilization for little possible gain.

When a cache miss occurs for element 403a, transferring two cache lines 403 increases a likelihood that sufficient data is stored within the cache to resolve the cache miss and to reduce a likelihood of a subsequent cache miss. This likelihood is present because data element 403a is near the end of its cache line.

Another embodiment of the invention is disclosed, again with reference to the memory diagram of FIG. 4. During a cache miss, a pre-fetching transaction for pre-fetching multiple cache lines in the form of two cache lines 402 each having four data elements is performed when the following two conditions are met: the element that caused the cache miss in a cache line is the first element 402a in that cache line; and the element that caused the cache miss 402a in a cache line is both four data elements aligned and eight data elements aligned.

When the above two conditions are met a double sized pre-fetch transaction is performed, thereby transferring the eight data elements 402 using the second mode of operation. This advantageously allows the processor to operate unstalled as soon as the first element 402a that caused the cache miss is provided to the processor. Furthermore, all data elements of the first cache line are received by the processor prior to having any data elements of the next line, or pre-fetched line, presented to the processor. This therefore allows the processor's refill unit to be freed as soon as the first four elements of the 8-element transaction are provided to the processor.

When a data element within a cache line but other than a first data element causes a cache miss, because of the linear address wrap around, transferring of two sequential cache lines is avoided in the present embodiment. As such, elements from the next sequential cache line are not transferred as the processor operates in the first mode of operation.

Advantageously, the performance of the pre-fetching technique in accordance with the embodiment operates efficiently when instruction cache references have a highly regular, sequential access pattern. Since, when a reference to a certain cache line occurs in the memory subsystem, it is highly likely that the sequential cache line is referred to in the near future. Therefore, by providing both cache lines, current and sequential, to the processor, processor stall cycles are reduced as well as total constant latencies associated with the pre-fetch transactions.

Data cache references for streaming/sequential access patterns benefit from sequential pre-fetching. These access patterns usually miss a cache line on its first element. Advantageously, the process of pre-fetching the current and next sequential cache lines in accordance with the embodiment of the invention is beneficial for streaming/sequential access patterns when the first element within the cache line for which the miss occurred is eight elements aligned.

Of course, when the first element within the cache line for which the miss occurred is other than eight elements aligned, there is no performance hit on the system since it defaults to the "normal" cache pre-fetch operation of the system.

Though the invention is described with single and double cache line sizes, it may be applied with other multiple cache line sizes. Preferably, the multiple cache line size is a power of 2. Further preferably, a number data elements within a cache line is a power of two.

Numerous other embodiments may be envisaged without departing from the spirit or scope of the invention.

What is claimed is:

1. A method of cache line fetching comprising the steps of:
   providing a first memory having a memory location therein for storing a first set of N data elements and a second adjacent set of N data elements, both sets of data elements line aligned within the first memory, wherein N data elements form an integral number of lines;
   providing a cache memory;
   providing a processor for accessing the cache memory and for operating in each of two modes, a first mode and a second mode;
   determining a mode of operation of the processor;
   when the processor is in the first mode of operation, transferring data from the first memory to the cache memory N data elements at a time; and, at least some times when the processor is in the second mode of operation, transferring data from the first memory to the cache memory M×N data elements at a time wherein M is an integer greater than 1; wherein the first mode includes a cache hit mode wherein data requested by the processor is stored within the cache at a time of a request therefor and wherein the second mode includes a cache miss mode wherein data requested by the processor is other than stored within the cache at a time of a request therefor.

2. A method of cache line fetching according to claim 1, comprising the steps of:
   determining whether a data element for which a cache miss has occurred is M line aligned within the first memory, and wherein the step of transferring data from the first memory to the cache memory M×N data elements at a time is performed only when the data element is M line aligned.

3. A method according to claim 2, wherein M is a power of 2.

4. A method according to claim 2, wherein M is 2.

5. A method according to claim 3, wherein N=4.

6. A method according to claim 1, comprising the steps of determining whether a data element for which a cache miss has occurred is within a line of data elements that is M line aligned within the first memory, and wherein the step of transferring data from the first memory to the cache memory M×N data elements at a time is performed only when the data element is M line aligned.

7. A method according to claim 5, wherein M is a power of 2.

8. A method according to claim 6, wherein M is 2.

9. A method according to claim 7, wherein N=4.

10. A memory having data stored therein, the data relating to instructions for performing the steps of:
    determining a mode of operation of the processor from a plurality of modes of operation including a first mode of operation and a second mode of operation;
    when the processor is in the first mode of operation, transferring data from the first memory to the cache memory N data elements at a time; and,
    at least some times when the processor is in the second mode of operation, transferring data from the first memory to the cache memory M×N data elements at a time wherein M is an integer greater than 1; wherein the data is for performing instructions such that the first mode includes a cache hit mode wherein data requested by the processor is stored within the cache memory at a time of a request therefor and wherein the second mode includes a cache miss mode wherein data requested by the processor is other than stored within the cache at a time of a request therefor.

11. A memory according to claim 9, wherein the data relates to instructions for performing the step of determining whether a data element for which a cache miss has occurred is M line aligned within the first memory, and wherein the step of transferring data from the first memory to the cache memory M×N data elements at a time is performed only when the data element is M line aligned.

12. A memory according to claim 10, wherein M is a power of 2.

13. A memory according to claim 12, wherein M is 2.

14. A memory according to claim 11, wherein N=4.

15. A memory according to claim 9, wherein the data relates to instructions for performing the step of determining whether a data element for which a cache miss has occurred is within a line of data elements that is M line aligned within the first memory, and wherein the step of transferring data from the first memory to the cache memory M×N data elements at a time is performed only when the data element is M line aligned.

16. A memory according to claim 13, wherein M is a power of 2.

17. A memory according to claim 14, wherein M is 2.

18. A memory according to claim 15, wherein N=4.

19. A memory system circuit comprising:
    a cache memory; and,
    a cache line fetch circuit for in a first mode of operation fetching in a single operation N data elements forming one or more cache lines into the cache memory and in a second other mode of operation fetching in a single operation M data elements forming more than a cache line into the cache memory, wherein M>N and wherein each of M and N form an integral number of cache lines; and further comprising a processor for operating within a cache hit mode of operation and cache miss mode of operation and wherein the fist mode of operation is the cache hit mode of operation of the processor and the second other mode of operation is the cache miss mode of operation of the processor.

20. A memory system circuit according to claim 17, wherein N data elements form one cache line and M data elements form multiple cache lines.

21. A memory system circuit according to claim 18, wherein M data elements form two cache lines.

22. A memory system according to claim 19, wherein N=4.

23. A memory system according to claim 17, comprising a processor for operating within a cache hit mode of operation and cache miss mode of operation and wherein the first mode of operation is the cache hit mode of operation of the processor and the second other mode of operation is the cache miss mode of operation of the processor.

24. A memory system according to claim 21, wherein the second other mode of operation is a cache miss mode wherein the cache miss relates to a data element within a cache line that is M data element aligned data element.

25. A memory system according to claim 22, wherein the second other mode of operation is a cache miss mode wherein the cache miss relates to a M data element aligned data element.

26. A memory system circuit comprising:

a cache memory; and, a cache line fetch circuit for in a first cache hit mode of operation fetching in a single operation N data elements forming one or more cache lines into the cache memory and for some times in a second cache miss mode of operation fetching in a single operation M data elements forming more than a cache line into the cache memory, wherein M>N and wherein each of M and N form an integral number of cache lines.

* * * * *